(12) United States Patent
Mahadevan et al.

(10) Patent No.: US 9,032,311 B2
(45) Date of Patent: May 12, 2015

(54) METHOD AND SYSTEM FOR IMPLEMENTING A COMPENSATION SYSTEM

(75) Inventors: Krishnaraj Mahadevan, Hyderabad (IN); Anadi Upadhyaya, Hyderabad (IN); Ty Hayden, Grand Junction, CO (US)

(73) Assignee: Oracle International Corporation, Redwood Shores, CA (US)

( * ) Notice: Subject to any disclaimer, the term of this patent is extended or adjusted under 35 U.S.C. 154(b) by 636 days.

(21) Appl. No.: 12/266,736

(22) Filed: Nov. 7, 2008

(65) Prior Publication Data

US 2010/0122218 A1    May 13, 2010

(51) Int. Cl.
*G06F 3/00*    (2006.01)
*G06Q 10/06*   (2012.01)
*G06F 3/0481*  (2013.01)

(52) U.S. Cl.
CPC ............ *G06Q 10/06* (2013.01); *G06F 3/04812* (2013.01)
USPC ............ 715/762; 715/853; 715/764; 715/810

(58) Field of Classification Search
CPC .................................................. G06F 3/04812
USPC ........................................ 715/853, 764, 810
See application file for complete search history.

(56) References Cited

U.S. PATENT DOCUMENTS

| | | | |
|---|---|---|---|
| 5,619,688 A * | 4/1997 | Bosworth et al. .................... 1/1 |
| 5,666,526 A * | 9/1997 | Reiter et al. ......................... 1/1 |
| 5,726,914 A * | 3/1998 | Janovski et al. ................. 702/84 |
| 5,924,073 A * | 7/1999 | Tyuluman et al. ................. 705/2 |
| 5,926,794 A   | 7/1999 | Fethe |
| 6,016,488 A * | 1/2000 | Bosworth et al. .................... 1/1 |
| 6,035,295 A   | 3/2000 | Klein |
| 6,049,779 A   | 4/2000 | Berkson |
| 6,338,042 B1* | 1/2002 | Paizis ........................... 705/7.37 |
| 6,754,874 B1  | 6/2004 | Richman |
| 6,853,975 B1  | 2/2005 | Dirksen et al. |
| 7,024,372 B2* | 4/2006 | Kobayashi .................... 705/7.42 |
| 7,069,266 B2* | 6/2006 | Calderaro et al. ............. 707/783 |
| 7,082,404 B2* | 7/2006 | Calderaro et al. ........... 705/7.42 |
| 7,233,971 B1* | 6/2007 | Levy .............................. 709/203 |
| 7,376,569 B2* | 5/2008 | Plunkett et al. ............... 705/320 |
| 7,647,322 B2* | 1/2010 | Thomsen ....................... 715/738 |
| 7,689,682 B1* | 3/2010 | Eldering et al. .............. 709/223 |
| 7,693,808 B2  | 4/2010 | Tingling |
| 7,707,052 B2* | 4/2010 | Kuhn et al. ................... 705/7.38 |
| 7,801,755 B2  | 9/2010 | Doherty et al. |
| 7,805,381 B2  | 9/2010 | Habichler et al. |
| 2001/0032097 A1* | 10/2001 | Levey ............................... 705/1 |
| 2001/0032120 A1  | 10/2001 | Stuart et al. |

(Continued)

OTHER PUBLICATIONS

J. Simon, Excel 2000 in a Nutshell, O'Reilly Media, Pub. Date Aug. 24, 2000, table of contents pp. 1-4.*

(Continued)

*Primary Examiner* — William Titcomb

(74) *Attorney, Agent, or Firm* — Vista IP Law Group, LLP

(57) ABSTRACT

Described is an improved method, system, and computer program product for implementing an improved approach for a compensation system and related interfaces that avoids the problems of the prior approaches. According to some approaches, interfaces are provided that comprises multiple modes of compensation entry, in which data elements within the multiple modes are linked together in a coordinated way.

39 Claims, 14 Drawing Sheets

(56) References Cited

U.S. PATENT DOCUMENTS

| | | | |
|---|---|---|---|
| 2003/0004736 A1 | 1/2003 | Calderaro et al. | |
| 2003/0004783 A1 | 1/2003 | Calderaro et al. | |
| 2003/0004789 A1 | 1/2003 | Calderaro et al. | |
| 2003/0004790 A1 | 1/2003 | Calderaro et al. | |
| 2003/0149613 A1 | 8/2003 | Cohen et al. | |
| 2003/0216957 A1 | 11/2003 | Florence et al. | |
| 2004/0012588 A1 | 1/2004 | Lulis | |
| 2004/0088177 A1 | 5/2004 | Travis et al. | |
| 2004/0138944 A1 | 7/2004 | Whitacre et al. | |
| 2004/0210820 A1* | 10/2004 | Tarr et al. | 715/500 |
| 2004/0215503 A1 | 10/2004 | Allpress et al. | |
| 2005/0154695 A1 | 7/2005 | Gonzalez et al. | |
| 2005/0192823 A1* | 9/2005 | Kuhn et al. | 705/1 |
| 2005/0195747 A1 | 9/2005 | Stamps et al. | |
| 2005/0228762 A1 | 10/2005 | D'Elena et al. | |
| 2006/0010001 A1 | 1/2006 | Hamelink | |
| 2006/0015393 A1 | 1/2006 | Eisma et al. | |
| 2006/0259340 A1 | 11/2006 | Doherty et al. | |
| 2007/0239468 A1* | 10/2007 | O'Brien et al. | 705/1 |
| 2007/0260513 A1* | 11/2007 | Pavlov | 705/14 |
| 2007/0266054 A1* | 11/2007 | Stephens et al. | 707/200 |
| 2007/0299709 A1 | 12/2007 | Harrell et al. | |
| 2008/0228549 A1 | 9/2008 | Harrison | |
| 2008/0235219 A1* | 9/2008 | Dimitruk et al. | 707/5 |
| 2009/0024647 A1 | 1/2009 | Hein | |
| 2009/0276297 A1 | 11/2009 | Ehrler et al. | |
| 2009/0307025 A1 | 12/2009 | Menon | |
| 2009/0319344 A1 | 12/2009 | Tepper et al. | |
| 2010/0064737 A1 | 3/2010 | Upadhyaya et al. | |
| 2010/0100771 A1 | 4/2010 | Upadhyaya et al. | |
| 2010/0106541 A1 | 4/2010 | Upadhyaya et al. | |
| 2010/0114672 A1 | 5/2010 | Klaus et al. | |
| 2010/0121685 A1 | 5/2010 | Mahadevan et al. | |
| 2010/0121686 A1 | 5/2010 | Mahadevan et al. | |
| 2010/0125784 A1 | 5/2010 | Hayden et al. | |
| 2010/0198634 A1 | 8/2010 | Hayden et al. | |
| 2010/0223572 A1 | 9/2010 | Upadhyaya et al. | |
| 2010/0274620 A1 | 10/2010 | Upadhyaya et al. | |
| 2012/0047053 A1 | 2/2012 | Favreau et al. | |

OTHER PUBLICATIONS

Office Action dated Nov. 24, 2010 for U.S. Appl. No. 12/266,804.
Office Action dated May 3, 2011 for U.S. Appl. No. 12/267,174.
Final Office Action dated May 9, 2011 for U.S. Appl. No. 12/266,804.
Final Office Action dated Oct. 13, 2011 for U.S. Appl. No. 12/267,174.
Non-final Office Action dated Oct. 4, 2013 for U.S. Appl. No. 12/266,804.
Final Office Action dated Mar. 28, 2014 for U.S. Appl. No. 12/266,804.
Non-final Office Action dated Jun. 6, 2014 for U.S. Appl. No. 12/267,174.
Notice of Allowance dated Jun. 6, 2014 for U.S. Appl. No. 12/266,804.
Non-final Office Action dated Aug. 6, 2014 for U.S. Appl. No. 12/266,804.
Non-final Office Action dated Nov. 18, 2014 for U.S. Appl. No. 12/267,174.
Final Office Action dated Dec. 12, 2014 for U.S. Appl. No. 12/266,804.

* cited by examiner

Bonus - 2007 - Barry Erickson

| Evaluate | Promote | Reward | Approve | Communicate |

☐ Summary

| Component | Eligible Employees | Employees Compensated |
|---|---|---|
| ⊞ Bonus - 2007 | 36 | 36 (100.0%) |

Employee Rewards

Actions ▼   View ▼   Structure ▼                                    ☑ Edit

My Filters [          ]

| Employee | Alert | Status | Base Salary ⓘ | Eligible Salary ⓘ | Target % |
|---|---|---|---|---|---|
| ⊞ 👤 Blair Palmer | | Eligible | 10,177.68 USD | 122,132.16 USD | 4.50 |
| ⊞ 👤 Elizabeth Mavery | | Eligible | 9,695.73 USD | 116,348.76 USD | 5.10 |
| ⊞ 👤 Janice Hardaway | | Eligible | 8,305.88 USD | 99,670.56 USD | 5.00 |
| ⊞ 👤 Lee Sanborn | | Eligible | 13,843.13 USD | 166,117.56 USD | 2.00 |
| ⊞ 👤 Robert James | | Eligible | 11,568.16 USD | 138,817.92 USD | 4.50 |
| ⊞ 👤 Toby Schwartz | | Eligible | 10,515.16 USD | 126,181.92 USD | 4.00 |

208 (Summary section)
202 (Employee Rewards section)

FIG. 2

| Employee | Alert | Status | Base Salary | Eligible Salary | Target % | Bonus % | | Bonus Amount | |
|---|---|---|---|---|---|---|---|---|---|
| Blair Palmer | | Eligible | 10,177.68 USD | 122,132.16 USD | 4.50 | | | | USD |
| Elizabeth Mavery | | Eligible | 9,695.73 USD | 116,348.76 USD | 5.10 | | | | USD |
| Janice Hardaway | | Eligible | 8,305.88 USD | 99,670.56 USD | 5.00 | | | | USD |
| Lee Sanborn | | Eligible | 13,843.13 USD | 166,177.56 USD | 2.00 | | | | USD |

Blair Palmer: View / Change Peer Group

Define peer group as employees of the same:

☑ Job ☐ Position ☑ Country
☑ Salary Basis ☐ Currency ☐ Grade

Peers of Blair Palmer

| Name | Email | Job | Position | Country |
|---|---|---|---|---|
| Elizabeth Mavery | elizabeth.mavery@oracle.com | DIR.300.Director | Sales Manager | United Kingdom |
| Jenice Hardaway | jenice.hardaway@oracle.com | DIR.300.Director | Sales Manager | United States |
| Lee Sanburn | lee.sanburn@oracle.com | DIR.300.Director | Sales Manager | United States |
| Robert James | robert.james@oracle.com | DIR.300.Director | Sales Manager | United States |
| Toby Schwartz | toby.schwartz@oracle.com | DIR.300.Director | Sales Manager | United States |

Total Peers 5

It is recommended that you keep your peer group under 50 employees.

☐ Location     ☐ Legislation      ☐ Organization
☐ Work Hours   ☐ Years in Company ☐ Years in Job

| Location | Legislation | Organization | Department | Full time Status | Salary Basics |
|---|---|---|---|---|---|
| London | | United Kingdom Marketing | | | 116,348,76 |
| British Columbia,HQ | | North American Marketing | | | 116,348,76 |
| British Columbia,HQ | | North American Marketing | | | 116,348,76 |
| British Columbia,HQ | | North American Marketing | | | 116,348,76 |
| British Columbia,HQ | | North American Marketing | | | 116,348,76 |

METHOD AND SYSTEM FOR IMPLEMENTING A COMPENSATION SYSTEM

BACKGROUND AND SUMMARY

The invention is directed to an approach for implementing compensation systems and interfaces related thereto.

A key challenge for modern organizations is the task of retaining the best and most talented employees. To make an organization competitive and attractive to job candidates, and/or to retain top employees, the organization must offer a competitive compensation package. The employee compensation package can be the deciding factor for many potential employees in their decision to work at one organization versus another organization.

The standard salary structure is one of the most common systems of compensation. The standard salary structure includes a base pay program that offers fixed salary ranges for each position type for employees performing the standard duties of their jobs. There may be minimum and maximum levels within those pay ranges to account for variations in experience and skill levels.

In addition to the base salary, the employee may also receive additional compensation that increases the overall compensation for the employee. Such additional compensation includes, for example, bonus payments, stock consideration, vacations and other forms of payment to the employee. Many of these forms of additional compensation are provided as part of a merit payment program based upon the employee's performance over all or part of a given compensation period.

Another type of compensation structure is the incentive-based compensation, which provides compensation to employees based upon the performance or results achieved by that employee. An example of this type of compensation includes commission based compensation. This type of compensation structure provides significant motivation for employees to produce substantial results.

A compensation tool or system may be used to manage the process of implementing and configuring employee compensations. Often, the employee compensation tool is implemented using a spreadsheet-like interface that lists the compensation values for the different employees. In operation, such a system is typically controlled by a user that manually edits values within the values of rows and columns in the spreadsheet.

Within any such compensation system, managers often need to perform "what-if" analysis while adjusting the compensation of the employees. The managers would run the what-if scenarios by manipulating compensation data for each employee, e.g., to help strike a fair balance or desired distribution among the employees. At the macro level, reports and analytics could be used to help the manager to compare the proposed compensation figures against defined targets, budgeted figures, external market data, and figures from different organizations within the company. This practice conventionally involves a two step iterative and time-consuming process. First, the manager alters the compensation figures for every employee under him and saves the data. Next, the manager then views the reports/analytics that run on the saved data to discover data inaccuracies, errors, overruns, shortfalls, and inequities. If the manager is not satisfied with the results, he returns to the first step to alter some or all of the compensation data and repeats the process.

The problem with this approach is that it is highly manual in nature, requiring a great deal of time and energy on the part of the manager to make changes to the different compensation values. In addition, if there are a large number of employees, the spreadsheet-based nature of the conventional interfaces may be come confusingly complex and cause the underlying data to become difficult for the manager to absorb.

Moreover, the conventional approaches may not allow important information to be easily accessible to the manager while he/she is performing the compensation analysis. For example, the pay structures for either salary-based or incentive-based compensation may be influenced by the compensation being paid to peers both within the same organization and at other organization in the same or similar industries/geography. Therefore, configuring the compensation package for a specific individual may require a manager to know and be able to access this type of information. However, the conventional spreadsheet interface may not be able to easily or effectively provide such information.

To address this and other problems, the present invention provides an improved approach for a compensation system and related interfaces that avoids the problems of the prior approaches. According to some embodiments, interfaces are provided that comprises multiple modes of compensation entry, in which data elements within the multiple modes are linked together in a coordinated way. Other and additional objects, features, and advantages of the invention are described in the detailed description, figures, and claims.

BRIEF DESCRIPTION OF FIGURES

FIG. 3 illustrates an enlarged view of the example compensation system interface of FIG. 2.

FIG. 11 illustrates an example interface to edit a peer group according to some embodiments of the invention.

DETAILED DESCRIPTION

Figure 1:
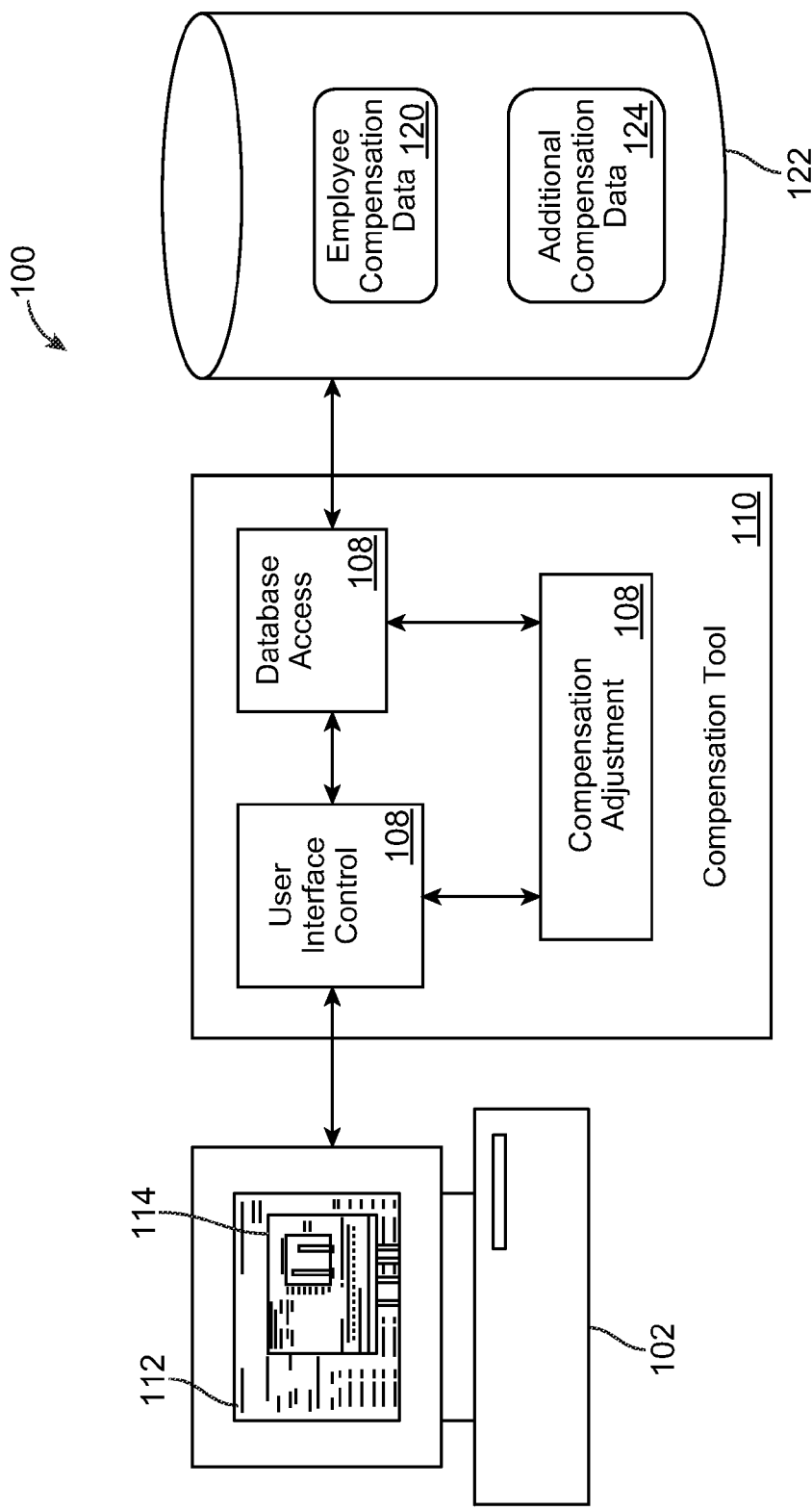
FIG. 1 shows an architecture of a compensation system according to some embodiments of the invention.

Embodiments of the present invention provide an improved approach for implementing compensation systems and interfaces for those compensation systems. According to some embodiments, interfaces are provided that comprises multiple modes of compensation entry, in which data elements within the multiple nodes are linked together in a coordinated way. This advanced interface facilitates the process of performing what-if analysis.

It would greatly benefit a manager in an organization to have access to a compensation tool that allows the manager to perform what-if analysis at the micro level. The compensation tool should react and dynamically show changes when each or any of the many compensation figures of an employee are changed or proposed within the tool. Some embodiments of the present invention provide a compensation calculator that can be used with any compensation/reward system that can assist the manager in proposing the individual compensation figures. The dynamic nature and informational content of the tool significantly aids the manager in his decision making process, by enabling the manager to propose compensation figure(s) through a multi-mode data entry mechanism that reflects the immediate results of the proposal. This allows the manager to try out different compensation figures, and further allows the manager to view the results alongside relevant data and changes and to select a satisfactory compensation figure.

One embodiment of the invention provides a compensation calculator that allows the manager to enter compensation figures as absolute values, percentages, ratios and/or relative to a range. A grid-only or table-only entry mechanism for these values, such as a spreadsheet-type interface, may allow the manager to enter values and see the related values with auto-calculation. However, the spreadsheet-based approach by itself is not intuitive enough to realistically aid the manager in decision making process, particularly for very large quantities of data. The present embodiment allows the manager to see how the proposed values stand in comparison with peer averages, market values and defined ranges before the manager finalizes the proposal compensation changes.

According to some embodiments, the multi-mode compensation calculator is implemented as a popup window with a mechanism to enter compensation values through multiple modes (e.g., manual typed input, slide over a range or spin). Editable fields in the tool re-calculate when any or some of the fields are changed. Therefore, the manager can enter the proposed value accordingly and see the other related values auto-calculate. The proposed values can be displayed in a way that shows comparisons to peer, market or other defined comparable data based upon the current unsaved value. The final selection made by the manager is applied as the proposed value to the employee record.

Illustrative examples of embodiments of the invention are provided below that describe the invention in the context of specific types of compensation types and in the context of compensation for "companies". It is noted, however, that the present invention can be employed with respect to any compensation structure or type. Furthermore, the invention can be applied to organizational structure or company. Therefore, the invention is not to be limited to the specific compensation types or organization structures illustrated below unless explicitly claimed as such.

FIG. 1 shows an architecture of a system 100 with which some embodiments of the invention may be implemented. System 100 comprises one or more users at one or more user stations 102 that access a compensation tool 110. User stations 102 could be implemented using any suitable platform to connect or interface with compensation tool 110. For example, user station 102 may be implemented as a remote workstation networked to the compensation tool 110, where the compensation tool interface 112 is configured and displayed using a web browser. As another example, user station may be implemented as a terminal directly linked to the compensation tool 110.

The user station 102 comprises a compensation tool interface 112 that is used by users to access and operate the compensation tool 110. The inventive compensation tool interface 112 corresponds to a multi-mode compensation calculator 114 that allows multiple modes of compensation entry and configuration. The user at user station 102 could be a manager that seeks to perform what-if analysis upon compensation structures for employees beneath him in the employment hierarchy by manipulating data values within the multi-mode calculator 114.

Compensation tool 110 can be implemented as software, hardware, or a combination of both software and hardware. According to one embodiment, compensation tool 110 comprises a software-based application that is used in conjunction with data controlled by a database management system (DBMS) product, e.g., database 122.

Compensation tool 110 includes a user interface control 108 that controls the interaction with compensation tool interface 112. In particular, user interface control 108 manages the display of information that is sent to user station 102 to be displayed at interface 112. User interface control 108 provides the functionality to display and control interaction with multi-mode compensation calculator 114. Any inputs provided by the user in the interface 112 (e.g., a change of a compensation value in the multi-mode calculator 114) would be tracked as an "event", which would cause corresponding data recording the user event to be sent to the compensation tool 110.

Compensation adjustment module 108 performs the functionality of re-calculating compensation values based upon input provided, by the user at interface 112. For example, the user may change a value in one mode of the multi-mode compensation calculator 114. Based upon the change in value provided by the user, the compensation adjustment module 108 re-calculates corresponding values for the other modes.

In operation, the compensation tool 110 may need to access database 112 to obtain employee compensation data 120 that is used to populate interface 112. A database access module 108 is responsible for accessing and obtaining the employee compensation data 120 from database 122. Database access module 108 is also responsible for implementing updates and changes to the employee compensation data 120 in database 122 based upon inputs and changes provided by the user at user station 102.

The interface 112 or multi-model calculator 114 may display additional items of data that would be relevant to the decision making process of the manager. For example, the interfaces could display how the proposed values stand in comparison with peer averages, market values, and defined ranges. The compensation tool 110 may access the database 122 to obtain these additional items of compensation data 122 and to display this data in interfaces 112 and 114.

Figure 2:
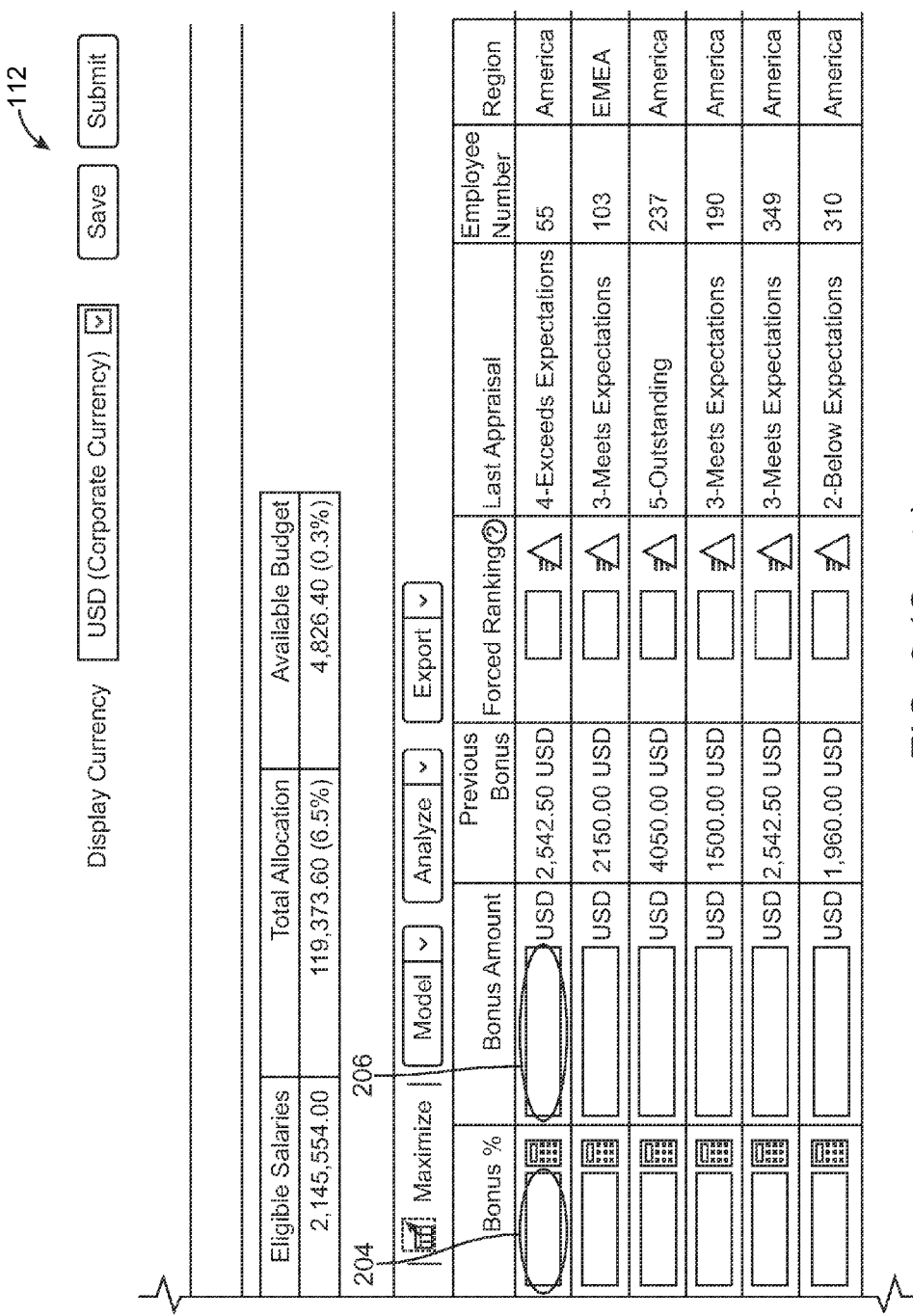
FIG. 2 illustrates an example compensation system interface according to some embodiments of the invention.

FIG. 2 illustrates an example compensation tool interface 112 that can be used to establish bonus compensation for employees. Interface 112 is used by manners to view and manipulate compensation data for bonuses for his/her reporting employees. Section 202 of interface 112 includes a separate row of data for each employee. Section 208 provides summarized information about the group of employees represented by the rows in section 202, such as the number of eligible employees, eligible salaries, total allocations, or available budget for additional compensation.

Each row of data in section 202 comprises fields for different types of compensation-related information. Field 206 comprises an entry method for entering a bonus amount for the employee that corresponds to a given row of section 202. Field 204 comprises at entry method for entering a bonus percentage for the employee that corresponds to a given row of section 202. As is evident, the difference between field 206 and field 204 is that field 206 is configured for entry of an absolute bonus amount, whereas field 204 is configured for entry of a percentage of the employee's salary to be used to calculate the bonus amount. Numerical values are directly entered into these fields to establish bonus compensation to be awarded to employees.

When performing compensation calculations, it is often desirable to allow multiple modes of entry with dynamic visual displays of the updated compensation data FIG. 3 illustrates an enlarged version of the section 202 in interface 112 that includes a control feature 220 to access a pop-up window corresponding to the multi-mode compensation calculator 114. Control feature is implemented using a calculator icon, and when the control feature 220 is selected, a multi-mode calculator 114 is displayed to the user.

Figure 4:
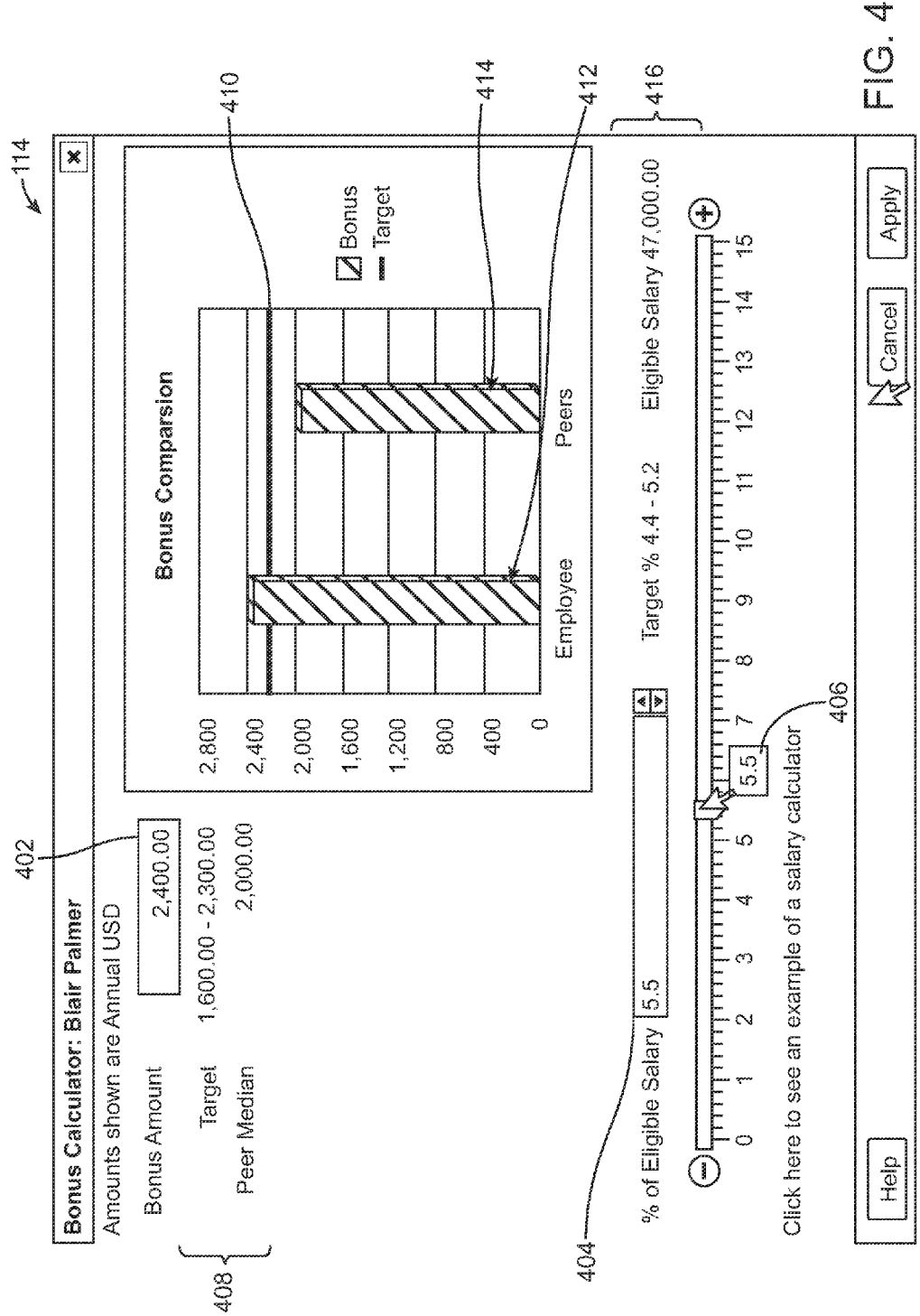
FIG. 4 illustrates an example multi-mode compensation calculator according to some embodiments of the invention.

FIG. 4 shows an example multi-mode compensation calculator 114 for determining bonus amounts which has three different modes of entry for compensation figures. Mode 402 of the calculator 114 is directed to a first mode of entry comprising a field for directly entering a numerical bonus amount for the employee. This mode of entry involves the manager first deciding upon a specific bonus amount, and then entering that bonus amount into the field provided for entering such information.

To assist in this process, information content 408 is placed near mode 402 that provides information to guide the manager for this first mode of entry. In this example, informational content 408 identifies the target range of bonus values as well as the peer median bonus value for the employee being reviewed. While this example only shows the target range and peer median values, other types of information materials may also be displayed to the manager at 408.

The second mode 404 is a slider mode for entering a bonus percentage value for the employee. The spinbox includes both an up-arrow and a down-arrow for adjusting the bonus percentage either upwards or downwards, respectively.

The third mode 406 is a slider mode for entering a bonus percentage value. This mode includes a slider bar that can be moved/dragged from side to side to control the bonus percentage for the employee.

To guide the manager in the process of selecting the bonus percentage, information content 416 discloses supporting information for these modes of entry, such as the target bonus percentage and eligible salary for the specific employee that is presently being reviewed. This information provides guidance to the user of the calculator, allowing the user to immediately have at hand information relevant to selection of a bonus percentage level.

Manipulation of any of the modes of entry would cause a corresponding change that is reflected in the fields for the other modes of entry. For example, a change in the absolute bonus amount in the first mode 408 would dynamically result in a change in the displayed value of the bonus percentage value within the spinbox for mode 404 and the position of the slider bar for mode 406 that is equivalent to the absolute bonus amount. Similarly, a change in the bonus percentage at either the spinbox for mode 404 or the slider position of mode 406 would result in a re-calculated absolute bonus amount displayed in mode 408 that is reflective of and corresponding to the new bonus percentage from either mode 404 or mode 406.

One of the advantages of the multi-mode compensation calculator 114 is the nearby display of supporting information that is relevant and helpful to the manager in his use of the calculator interface. As previously noted, information fields 408 and 416 provide helpful information for each mode of entry, with items of information chosen to be displayed at a location on the interface that is in close proximity to the mode of entry related to the supporting information. For example, the supporting information content 408 located in close proximity to mode 402 for entry of absolute bonus amounts contains the peer data that is displayed as absolute bonus amounts. The supporting information content 416 located in close proximity to modes 404 and 406 for entry of bonus percentage amounts contains the target data that is displayed as percentage amounts.

Real-time data in the form of graphics can be provided to assist the manager's decision-making process. In the example calculator 114, a real-time chart 410 is shown that dynamically displays the employee bonus amount 412 that was entered using any of the modes of entry 402, 404, or 406. The peer median bonus amount 414 is also displayed in the chart 410. Any suitable or desired graphic may be implemented and displayed in the multi-mode compensation calculator 114.

The dynamic displays and coordinated, nature of the different modes of entry for calculator 114 makes the process of performing what-if analysis much easier and efficient for a manager. Any change for the compensation values in one mode is automatically and dynamically reflected in the other modes. The compensation calculator 114 allows managers to enter the reward amount or percentage of eligible salary while viewing statistics, either numerically or graphically, including statistics such as peer amount comparisons. Therefore the manager can make an informed decision as well as compare the allocation that is planned for the employee's peers and the target ranges.

Figure 5:
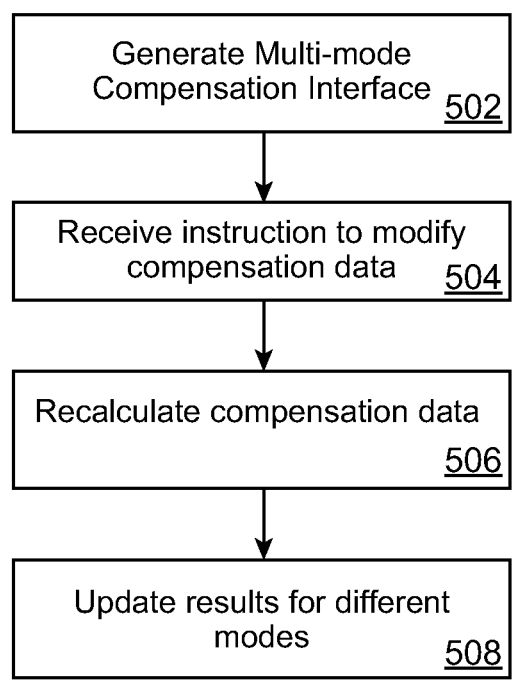
FIG. 5 shows a flowchart of a process for implementing a multi-mode interface according to some embodiments of the invention.

FIG. 5 shows a flowchart of a process for implementing a compensation system according some embodiments of the invention. At 502, the process generates a multi-mode interface for a compensation system. The multi-mode interface, according to some embodiments, comprises a compensation calculator that allows multiple modes of entry.

The multi-mode interface can be implemented for any compensation structure or data value. For example, a multi-mode compensation calculator can be implemented for salary amount, bonus compensation, vacations, stock incentives, commission amount or percentages, and other form of compensation or incentives.

The multi-mode interface can be configured to display informational support content that facilitates decision-making by the user of the interface. The interface may include textual, numerical, and/or graphical elements that are used to display information or to enter instructions to change compensation-related data values.

At 504, an instruction is received to modify one or more items of compensation data. For example, if the multi-mode interface comprises a mode of entry to change or insert a bonus amount for an employee, then 504 would involve the user using one of the modes of entry to modify the employee bonus amount.

Next, at 506, the instructions received at 504 to change the compensation data is used to re-calculate the data for other modes of entry that are linked to the changed data. For example, if a first mode of entry is directed to an absolute bonus amount and a second mode of entry is directed to a bonus percentage amount, then changing the bonus percentage amount would cause a corresponding re-calculation of the absolute bonus amount to an equivalent value.

Thereafter, at 508, the updated values are dynamically changed for the different modes of entry on the interface. At this point, the different modes of entry that are linked together should display equivalent data values for the different modes.

Figure 6:
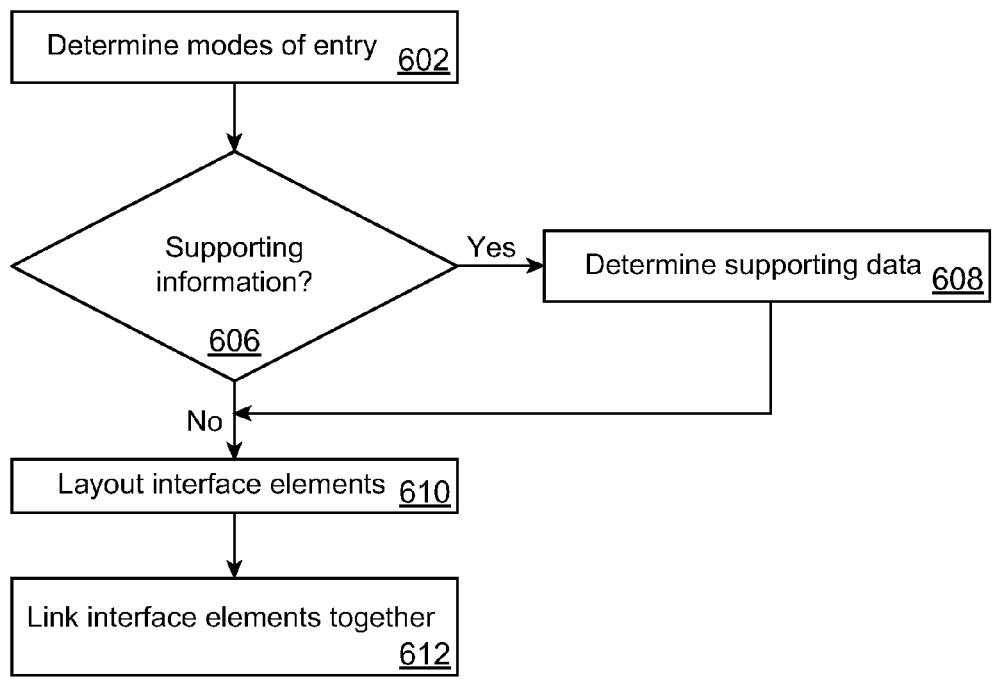
FIG. 6 shows a flowchart of a process for generating a multi-mode interface according to some embodiments of the invention.

FIG. 6 shows a flowchart of a process for generating the multi-mode compensation calculator according to one embodiment of the invention. At 602, a determination is made of the different modes of entry that are to be used on the interface. The designer of the interface may employ any suitable mode of entry that is appropriate for the specific type of data to be configured. Examples shown herein of a calculator interface for bonus amounts have illustrated a direct numerical entry box, a slider bar, and a spinbox. However, any text, numeric, or graphics based entry mode may be employed as desired or needed within the scope of the invention. In addition, the multiple modes may relate to different formats and forms of the data to be configured. For example, the examples shown herein for a bonus compensation calculator illustrate different modes of entry for the employee bonus, where one mode is directed to an absolute bonus amount while another mode is directed to the bonus percentage. Both of the modes relate to the same employee bonus compensation, but exist as different formats and methods of visualizing and/or analyzing the bonus award. Moreover, multiple modes may be selected which relate to the same item of data to be configured. For example, for a bonus calculator, the same bonus percentage amount can be manipulated using multiple modes, e.g., using both a spinbox mode and a slider bar mode.

At 606, a determination is made regarding, whether the interface is to include supporting informational content. Such supporting informational content could include information that is provided to assist the user in making choices about the data items to be configured with the interface. If at 606 it is determined that the interface is to include such supporting informational content, then at 608 selection is made of the specific items of supporting material to include in the interface. Any type of supporting information can be suitably included within the interface. For example, in the example interface for determining employee bonus amounts, the supporting information to be displayed on the interface could include the target bonus amounts, eligible salaries, and peer bonus information. In addition, the supporting information can be specifically configured to correspond to one or more of the modes of entry. For example, the supporting information relating to a bonus target for the employee could be displayed as a percentage range for modes that relate to percentage entry of the bonus, but could be displayed as a range of absolute numerical values for modes that relate to entry of absolute bonus amounts. The supporting informational content can be configured to include elements that are textual, numerical, or graphical in nature. For example, charts or graphics can be used to display supporting information about bonus comparisons between the employee and his/her peers.

The layout of the interface is configured at 610. This action configures the placement of interface elements for each mode onto as specific location on the interface. In addition, the elements for the supporting information are also placed at specific location on the interface. According, to some embodiments, the supporting information relevant to particular modes are placed in locations on the interface that are closer in proximity to the display element for those modes.

At 612, the related modes that correspond to one another are linked together. If there are multiple modes that relate to the same item or items of data, then the data fields for those modes are linked together such that any change or manipulation of the data item(s) in one mode will cause a corresponding change or manipulation in the other mode(s).

Figure 7:
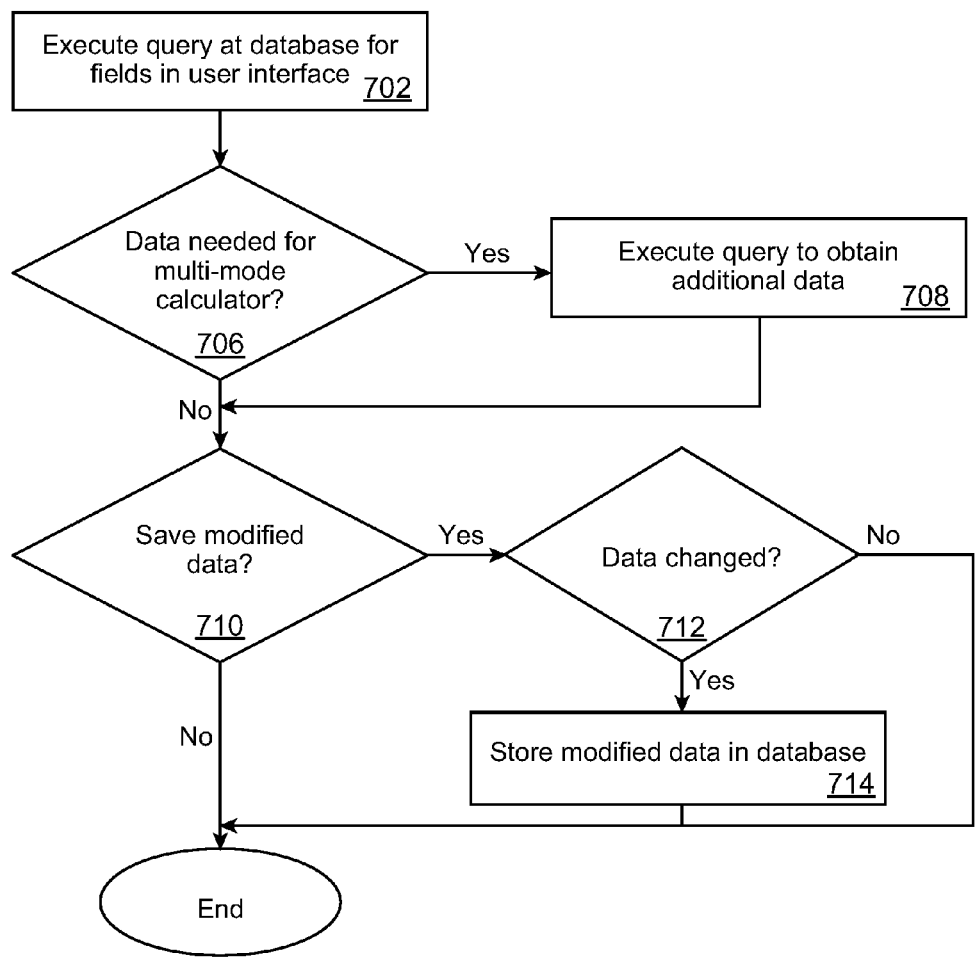
FIG. 7 shows a flowchart of a process for implementing database access according to some embodiments of the invention.

FIG. 7 shows a flowchart of a process for accessing a database by the compensation tool. At 702, the process executes a query at an employee database to populate the fields in the user interface, e.g., the fields shown in the user interface of FIG. 2. The database can be a relational database, such as but not limited to the Oracle™ 11G database, available from Oracle Corporation of Redwood Shores, Calif., USA. According to some embodiments, the employee data is stored in relational tables in a relational database management product. Therefore, one or more SQL-based queries are employed to obtain the necessary items of data from the relational tables. If a multi-mode compensation calculator is initiated at 706, and if any additional items of data are needed from the database for the calculator, then at 708 a query is executed to obtain those items of data.

At 710, a determination is made whether there is a pending instruction to save the data being operated upon in the interface. If such an instruction has been received, then a check is made to identify whether any of the data items has been modified at 712. If so, then at 714, the changed data items are saved to the database.

Figure 8:
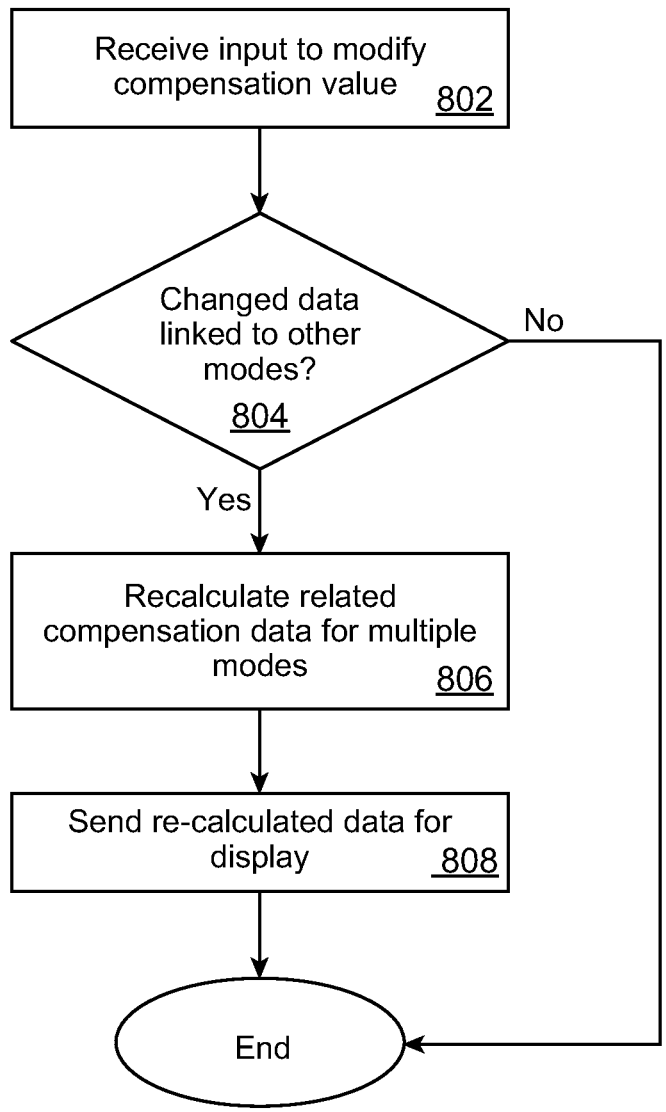
FIG. 8 shows a flowchart of a process for performing re-calculations of compensation values according, to some embodiments of the invention.

FIG. 8 shows a flowchart of a process for performing compensation calculations by the multi-mode calculator according to one embodiment of the invention. At 802, an instruction is received to change the value of a data value for one of the modes. This can be implemented in some embodiments by performing event management on the user interface, whereby an action by the user using either the mouse or keyboard to modify the value of data in any of the modes of entry is detected by the computing system.

Next, at 804, a determination is made whether the mode for which the data value has changed is linked to data within another mode. For example, a first mode of entry may present bonus compensation as an absolute numerical value while a second mode of entry presents the bonus compensation as a percentage of eligible salary. These two modes are linked together since they both relate to the same bonus amount, even though they are presented in different formats or modes. Therefore, if the mode for which the data value has changed is linked to data within another mode, then at 806 the type and quantity of change for the data value is analyzed and re-calculation is performed to determine the equivalent data value change for the linked modes. For example, a change in the absolute bonus award amount for a first bonus mode is re-calculated to determine the equivalent percentage value for a second mode.

In effect, the change in the data for a first mode is identified as an event which causes re-calculation of equivalent values for another mode. The re-calculation generates a new data value for the related mode(s) which correspond to the changed data, value in the first mode. At 808, the changed data value(s) in the related mode(s) are then used to change the display of the related modes), e.g., by changing the position of a slider bar or the value of a displayed number.

The content shown in the multi-mode calculator may vary with different plans or options. For example for a salary increase plan, details such as new salary and grade ranges can be shown. This is in contrast to a bonus plan which may not include such details.

Figure 9:
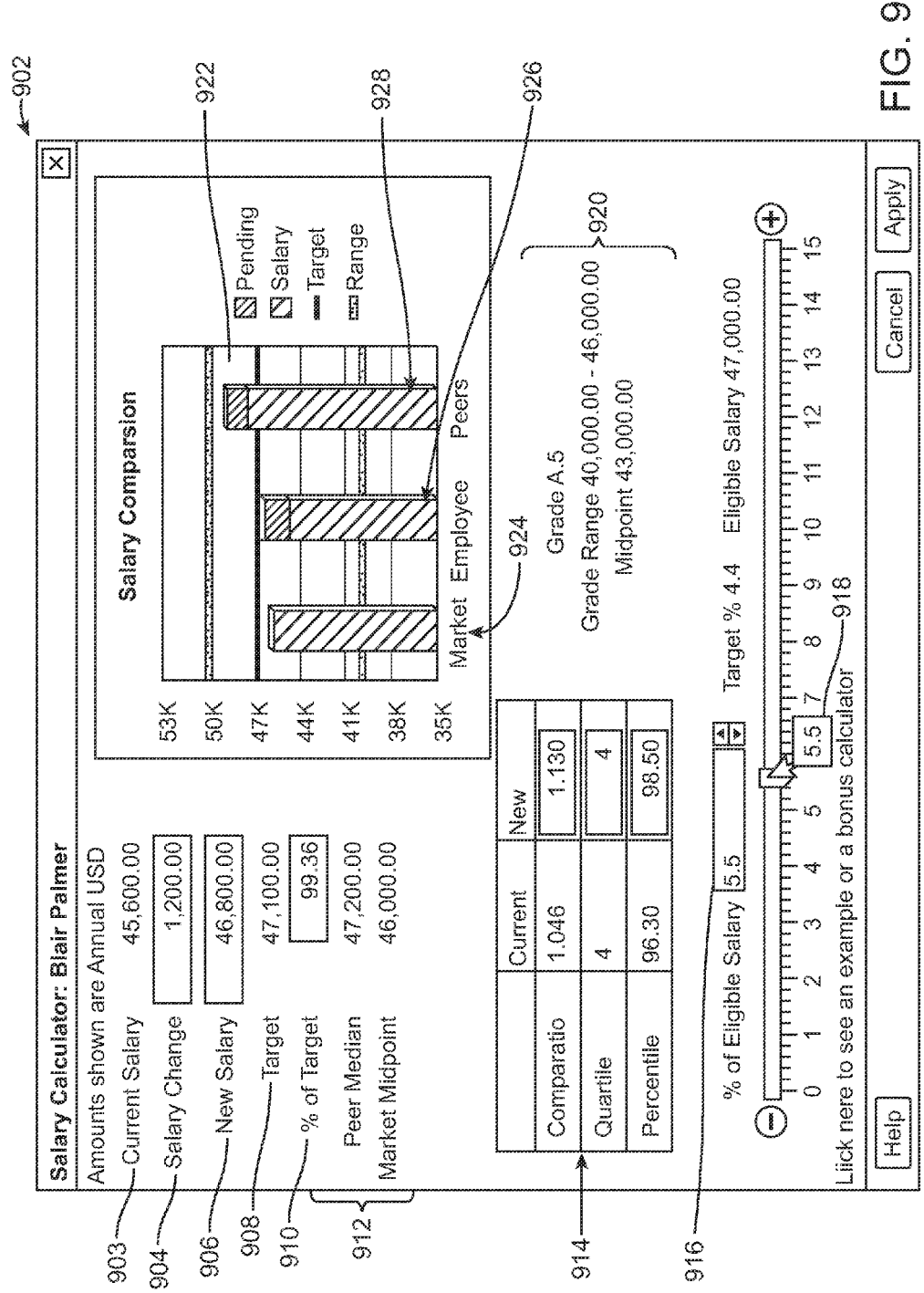
FIG. 9 illustrates an example multi-mode salary calculator according to some embodiments of the invention.

FIG. 9 shows an example compensation calculator 902 for a salary plan that includes multiple modes for configuring employee salary compensation. Mode 904 provides a first mode of entry, in which a numerical field exists for the user to input a value identifying a salary change for the employee. The salary change value is a numerical value that identifies the increase or decrease of salary for the employee. Mode 906 provides a second mode of entry, in which a field is provided for the user to enter the absolute value of the new employee salary. Mode 908 provides yet another mode of entry for the salary value, by allowing the user to identify the percentage of the larger salary to configure as the employee's salary.

For each of these modes, supporting informational content is provided to help guide the user in making the salary determinations. For example, field 903 displays the current employee salary as a starting point for the new salary configuration. Field 908 displays the target salary for the employee. Field 910 displays the peer median and market midpoint salary numbers for similarly situated workers Graphical modes 916 and 918 are also provided in the example interface 902 for entering new salary amounts. Mode 916 provides a spinbox for entering a percentage increase in salary for the employee. Mode 918 provides a slider bar to set the percentage increase in salary for the employee. Supporting information 920 is placed in close proximity to spinbox 916 and slider 918 to help guide the user making the salary increase decision. The supporting information 920 includes information about the eligible salary and the target percentage increase in salary.

Chart 914 allows the user to input new values for comparison on a quartile basis based upon a percentile value. In this chart, the user would modify multiple data elements to generate the new salary values. The chart shows both the current values as well as the newly changed values.

Graphics 922 dynamically illustrates the configured changes in employee salary 926 using a bar chart. The graphics 922 also illustrate the market salary compensation 924 and peer salary compensation 928. These graphics 922 allow an immediate visual manner of representation data so that the manager can make an informed decision regarding salary configurations, particularly with the view of market and peer data as points of comparison.

All the values in enterable fields of this region auto-adjust with change each other's value. For example, when the slider 918 is used to change the percentage of eligible salary, the change is reflected in the displayed value of the spinbox 916 for percentage of eligible salary as well as in the amount fields 904, 906, and 910. The graphical chart 922 is also redrawn to reflect the new values.

The inventive calculator interfaces can be configured with a predefined column list that can be used in the calculation, which includes columns in a worksheet (allocations) table that is either hidden or displayed (e.g. Previous Salary Change, Previous Bonus etc. etc.). This column list can include custom defined and configured columns using dynamic calculation, where the dynamic calculations allow a compensation administrator to automatically derive the value of one column upon the entry/update of another column, in a manner that is comparable to a cell calculation in a spreadsheet. In addition, values can be based on configurable conditions.

A manager can also define or view details on peer groups they are using in calculation. To illustrate consider the bonus calculator 1002 of FIG. 10 that includes several modes for entering a bonus compensation, including spinbox mode 1004, slider mode 1006, and numerical entry mode 1008. To support the user in making a bonus decision, the calculator 1002 also include supporting information 1010 and graphical chart 1012 that identifies peer information relevant to the bonus decision. For example, the peer average bonus amount and peer average bonus percentage are displayed at 101 and the peer average percentage is also displayed in chart form at 1012.

The specific employees of the peer group that supply this data can be configured, e.g., based upon a modifiable list of peers that is accessed by clicking on interface button 1014, FIG. 11 shows an example interface 1100 for displaying and modifying the list of peer employees. Control button 1104 lists a set of selectable filters, in which the selected filters (shown with a checked box) provide factors for identifying the specific list of employees that should be considered peer employees. The list of peer employs determined by the filters is shown in section 1104 of the interface 1100.

Therefore, what has been described is an improved approach for implementing a compensation system with a highly efficient and usable interface. The multi-mode calculator interface described herein allows a manager to perform what-if calculations in a manner that provide immediate dynamic feedback while also providing immediately accessible supporting information to help guide the user in making the compensation decisions. The present approach provides a very intuitive mechanism for manager to propose compensation amounts that saves time and effort. This reduces re-work due to overruns, shortfalls and inequities of proposed compensation values by detecting them during the proposal phase.

System Architecture Overview

Figure 12:
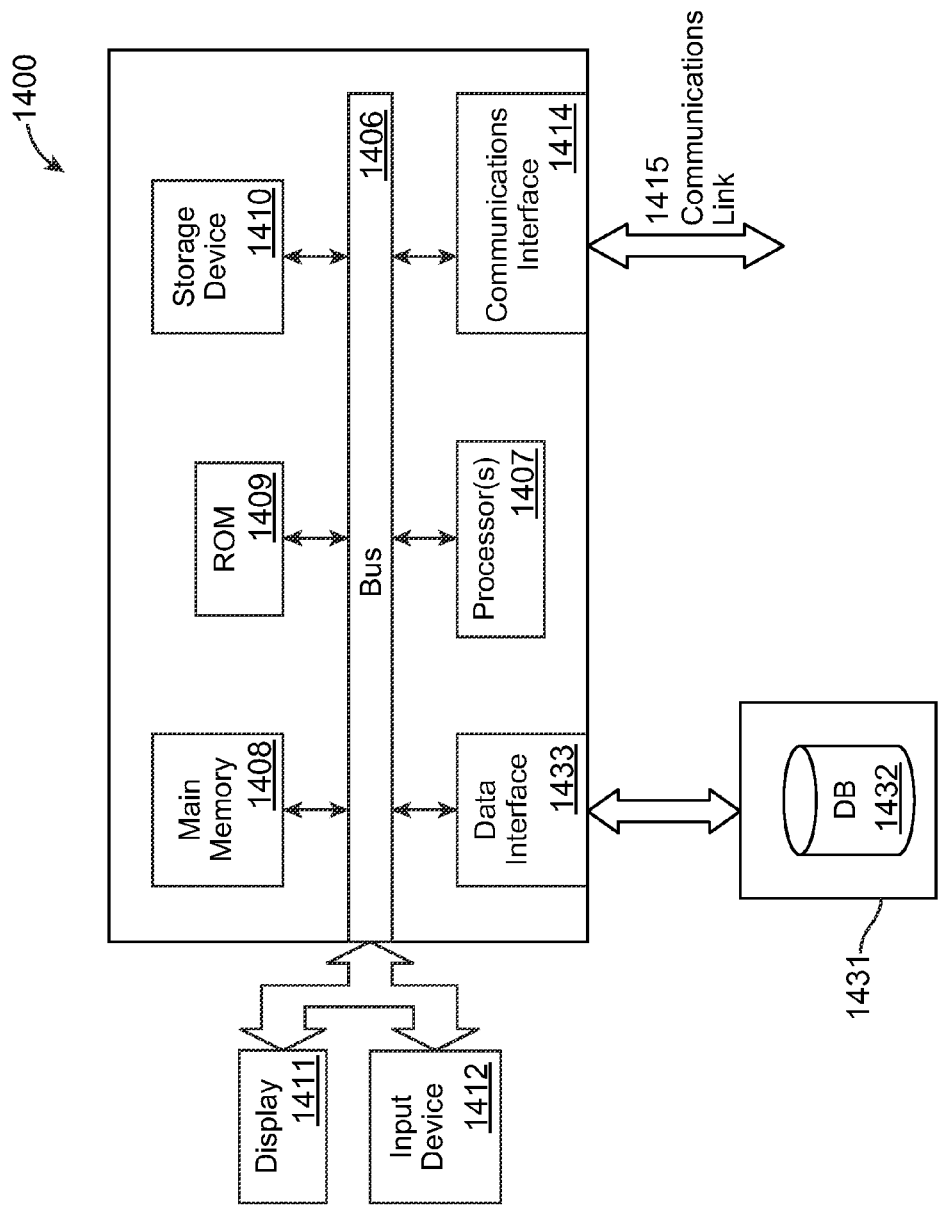
FIG. 12 shows an architecture of an example computing system with which the invention may be implemented.

FIG. 12 is a block diagram of an illustrative computing system 1400 suitable for implementing an embodiment of the present invention. Computer system 1400 includes a bus 1406 or other communication mechanism for communicating information, which interconnects subsystems and devices, such as processor 1407, system memory 1408 (e.g., RAM), static storage device 1409 (e.g., ROM), disk drive 1410 (e.g., magnetic or optical), communication interface 1414 (e.g., modem or Ethernet card), display 1411 (e.g., CRT or LCD), input device 1412 (e.g., keyboard), and cursor control.

According to one embodiment of the invention, computer system 1400 performs specific operations by processor 1407 executing one or more sequences of one or more instructions contained in system memory 1408. Such instructions may be read into system memory 1408 from another computer readable/usable medium, such as static storage device 1409 or disk drive 1410. In alternative embodiments, hard-wired circuitry may be used in place of or in combination with software instructions to implement the invention. Thus, embodiments of the invention are not limited to any specific combination of hardware circuitry and/or software. In one embodiment, the term "logic" shall mean any combination of software or hardware that is used to implement all or part of the invention.

The term "computer readable medium" or "computer usable medium" as used herein refers to any medium that participates in providing instructions to processor 1407 for execution. Such a medium may take many forms, including, but not limited to, non-volatile media and volatile media. Non-volatile media includes, for example, optical or magnetic disks, such as disk drive 1410. Volatile media includes dynamic memory, such as system memory 1408.

Common forms of computer readable media includes, for example, floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, or any other medium from which a computer can read.

In an embodiment of the invention, execution of the sequences of instructions to practice the invention is performed by a single computer system 1400. According to other embodiments of the invention, two or more computer systems 1400 coupled by communication link 1415 (e.g., LAN, PTSN, or wireless network) may perform the sequence of instructions required to practice the invention in coordination with one another.

Computer system 1400 may transmit and receive messages, data, and instructions, including program, i.e., application code through communication link 1415 and communication interface 1414. Received program code may be executed by processor 1407 as it is received, and/or stored in disk drive 1410, or other non-volatile storage for later execution.

In the foregoing specification, the invention has been described with reference to specific embodiments thereof. It will, however, be evident that various modifications and changes may be made thereto without departing from the broader spirit and scope of the invention. For example, the above-described process flows are described with reference to a particular ordering of process actions. However, the ordering of many of the described process actions may be changed without affecting the scope or operation of the invention. The specification and drawings are, accordingly, to be regarded in an illustrative rather than restrictive sense.

The invention claimed is:

1. A method for configuring compensation, comprising:
   using a computing system having at least one processor to performing a process, the process comprising:
   generating an interface having a first interface portion, a second interface portion, and a third interface portion for the interface, wherein the first interface portion corresponds to a first mode for configuring a compensation value, the second interface portion corresponds to a second mode for configuring the compensation value, and the third interface portion displays comparison information for the compensation value configured through either the first mode or the second mode relative to other compensations received or to be received by other persons;
   when the compensation value is configured or modified through the first mode of the first interface portion, calculating a corresponding change to the compensation value for the second mode, wherein the first mode is linked to the second mode such that the configuration or modification to the compensation value made through the first mode on the first interface portion is visually reflected in the second mode on the second interface portion based on the calculated corresponding change; and
   dynamically displaying in real-time, on the third interface portion of the interface, the comparison information, wherein
      the third interface portion, based on a received data corresponding to the configuration or modification of the compensation value, dynamically and graphically displays or modifies a display of a standing of the compensation value relative to the other compensations, such that the configuration or modification is visually reflected in the third interface portion while the compensation value is being configured or modified using either the first mode or the second mode, and
      the interface displays the first, the second, and the third interface portion at a same time in the same interface on a display apparatus of the computing system.

2. The method of claim 1 in which the interface further comprises a display of support information for the first mode and the second mode.

3. The method of claim 2 in which the display of support information comprises peer compensation information.

4. The method of claim 3 further comprising configuring a list of peers for the peer compensation information.

5. The method of claim 2 in which the display of support information is located on the interface in close proximity to a corresponding configuration mode.

6. The method of claim 2 in which the display of support information comprises at least one of graphics, text, or numerical information.

7. The method of claim 1 in which the first mode or the second mode comprises at least one of a data entry field, a slider bar, a spinbox, or a data entry chart.

8. The method of claim 1 in which the compensation value comprises at least one of bonus compensation, salary compensation, vacation compensation, stock compensation, commission compensation or any other type of compensation.

9. The method of claim 1 in which the first mode comprises a percentage of a compensation amount, an absolute compensation amount, or a compensation change amount.

10. The method of claim 1, in which a change in the compensation comprises at least one of a numeric value representing the corresponding change in the compensation value and a percentage value representing the corresponding change in the compensation value.

11. A method for generating a compensation interface, comprising:
    using a computing system having at least one processor to perform a process, the process comprising:
    determining a first and second modes of configuring a compensation value that is to be received by a person;
    determining whether supporting information is to be displayed on a compensation interface of the computing system, wherein the supporting information comprises a standing of the compensation value relative to other compensations that are received or are to be received by other persons;
    laying out at least a first interface element, a second interface element, and a third interface element on the compensation interface, wherein the first interface element corresponds to the first mode for configuring a compensation value, the second interface element corresponds to the second mode for configuring the compensation value, and the third interface element displays the supporting information, and wherein the compensation interface displays the first, the second, and the third interface element at a same time on the same interface of a display apparatus of the computing system; and
    dynamically displaying in real-time, on the third interface element, the supporting information while the compensation value is being configured by a user, wherein
       the third interface element, based on a received data corresponding to a configuration or modification of the compensation value through either the first mode or the second mode, dynamically and graphically displays or modifies the display of the standing of the compensation value while the compensation value is being configured in either the first mode or the second mode, and
       the first mode of the first interface element and the second mode of the second interface element are linked together such that a change in the compensation value made through the first mode automatically causes a corresponding change in the second mode.

12. The method of claim 11 in which the supporting information comprises peer compensation information.

13. The method of claim 12 further comprising configuring a list of peers for the peer compensation information.

14. The method of claim 13 in which the supporting information is located on the compensation interface in close proximity to a corresponding configuration mode.

15. The method of claim 13 in which the supporting information comprises at least one of graphics, text, or numerical information.

16. The method of claim 11 in which the first mode or the second mode comprises at least one of a data entry field, a slider bar, a spinbox, or a data entry chart.

17. The method of claim 11 in which the compensation value comprises at least one of bonus compensation, salary compensation, vacation compensation, stock compensation, or commission compensation.

18. The method of claim 11 in which the first mode comprises a percentage of a compensation amount, an absolute compensation amount, or a compensation change amount.

19. The method of claim 11, in which a change in the compensation value comprises at least one of a numeric value representing a change in the compensation value and a percentage value representing the change in the compensation value.

20. A system for configuring compensation, comprising:
a computing system having at least one processor that is to:
identify or generate an interface having a first interface portion, a second interface portion, and a third interface portion for the interface, wherein the first interface portion corresponds to a first mode for configuring a compensation value, the second interface portion corresponds to a second mode for configuring the compensation value, and the third interface portion displays comparison information for the compensation value,
when the compensation value is configured or modified through the first mode of the first interface portion, calculate a corresponding change to the compensation value for the second mode, wherein the first mode is linked to the second mode such that the configuration or modification to the compensation value made through the first mode on the first interface portion is visually reflected in the second mode on the second interface portion based on the calculated corresponding change; and
a display apparatus that is to dynamically display, in real-time, on the third interface portion of the interface a standing of the compensation value relative to other compensations received or to be received by other persons, wherein
the third interface portion, based on a received data corresponding to the configuration or modification of the compensation value, dynamically and graphically displays or modifies a display of the standing of the compensation value relative to the other compensations, such that the configuration or modification is visually reflected in the third interface portion while the compensation value is being configured or modified using either the first mode or the second mode, and
the interface displays the first, the second, and the third interface portion at a same time in the same interface on a display apparatus of the computing system.

21. The system of claim 20, in which the at least one processor is further to track an event that causes one or more changes in the compensation value or in a result of a comparison between the person and the other compensations received or to be received by other persons.

22. The system of claim 20, in which the at least one processor is further to execute a query to populate a data structure concerning the person for the at least one processor to determine the compensation value or to calculate the corresponding change.

23. The system of claim 20, further comprising one or more filters that are to be provided to the at least one processor to identify a list of persons whose compensations are to be compared with the compensation of the person.

24. The system of claim 20, in which a change in the compensation value comprises at least one of a numeric value representing the corresponding change in the compensation value and a percentage value representing the corresponding change in the compensation value.

25. A computer program product that includes a non-transitory computer readable storage medium, the non-transitory computer readable storage medium comprising a plurality of computer instructions which, when executed by at least one processor, cause the at least one processor to perform a process for configuring compensation, the process comprising:
generating, at a computing system, an interface having a first interface portion, a second interface portion, and a third interface portion for the interface, wherein the first interface portion corresponds to a first mode for configuring a compensation value, the second interface portion corresponds to a second mode for configuring the compensation value, and the third interface portion displays comparison information for the compensation value configured through either the first mode or the second mode relative to other compensations received or to be received by other persons;
when the compensation value is configured or modified through the first mode of the first interface portion, calculating, on a remote computing system, a corresponding change to the compensation value for the second mode, wherein the first mode is linked to the second mode such that the configuration or modification to the compensation value made through the first mode of the first interface portion is visually reflected in the second mode of the second interface portion based on the calculated corresponding change; and
dynamically displaying, in real-time, the comparison information on the third interface portion of the interface, wherein
the third interface portion, based on a received data corresponding to the configuration or modification of the compensation value, dynamically and graphically displays or modifies the display of a standing of the compensation value relative to other compensations, such that the configuration or modification is visually reflected in the third interface portion while the compensation value is being configured or modified using either the first mode or the second mode, and
the interface displays the first, the second, and the third interface portion at a same time in the same interface on a display apparatus of the computing system.

26. The computer program product of claim 25, the process further comprising:
tracking an event that causes one or more changes in the compensation value or in a result of a comparison between the person and the other compensations of the other persons.

27. The computer program product of claim 25, the process further comprising:
executing a query to populate a data structure concerning the person for the action of calculating the corresponding change.

28. The computer program product of claim 25, the process further comprising:
identifying a list of persons whose compensations are to be compared with the compensation value of the person by using one or more filters.

29. The computer program product of claim 25, in which a change in the compensation value comprises at least one of a numeric value representing the corresponding change in the compensation value and a percentage value representing the corresponding change in the compensation value.

30. A system for generating a compensation interface, comprising:
a computing system having at least one processor that is to:
determine a first and second modes for configuring a compensation value that is to be received by a person;
determine whether supporting information is to be displayed on a compensation interface of the computing system, wherein the supporting information comprises a standing of the compensation value relative to other modified compensations that are received or are to be received by other persons;
lay out at least a first interface element, a second interface element, and a third interface element on the compensation interface, wherein the first interface element corresponds to the first mode for configuring a compensation value, the second interface element corresponds to the second mode for configuring the compensation value, and the third interface element displays the supporting information, and wherein the compensation interface displays the first, the second, and the third interface element at a same time on the same interface of a display apparatus of the computing system; and
dynamically display, in real-time, on the third interface element, the supporting information while the compensation value is being configured by a user, wherein
the third interface element, based on a received data corresponding to a configuration or modification of the compensation value, dynamically and graphically displays or modifies the display of the standing of the compensation value while the compensation value is being configured in either the first mode or the second mode, and
the first mode of the first interface element and the second mode of the second interface element are linked together such that the configuration or modification of the compensation value made through the first mode automatically causes a corresponding change in second mode.

31. The system of claim 30, in which the at least one processor is further to track an event that causes one or more changes in the compensation value or in a result of a comparison between the user and another compensation of one or more users.

32. The system of claim 30, in which the at least one processor is further to execute a query to populate a data structure concerning the person for the at least one processor to calculate the corresponding change.

33. The system of claim 30, further comprising one or more filters that are to be provided to the at least one processor to identify a list of persons whose compensations are to be compared with the compensation value to be received by the person.

34. The system of claim 30, in which a change in the compensation value comprises at least one of a numeric value representing the change in the compensation value and a percentage value representing the change in the compensation value.

35. A computer program product that includes a non-transitory computer readable storage medium, the non-transitory computer readable storage medium comprising a plurality of computer instructions which, when executed by at least one processor, cause the at least one processor to perform a process for generating a compensation interface, the process comprising:
determining, at a computing system, multiple modes for configuring a compensation value that is to be received by a person;
determining whether supporting information is to be displayed on a compensation interface of the computing system, wherein the supporting information comprise a standing of the compensation value relative to other compensations that are received or are to be received by other persons;
laying out at least a first interface element, a second interface element, and a third interface element on the compensation interface, wherein the first interface element corresponds to a first mode for configuring a compensation value, the second interface element corresponds to a second mode for configuring the compensation value, and the third interface element displays the supporting information, and wherein the compensation interface displays the first, the second, and the third interface element at a same time on the same interface of a display apparatus of the computing system; and
the third interface element, based on a received data corresponding to a configuration or modification of the compensation value through either the first mode or the second mode, dynamically and graphically displays or modifies the display of the standing of the compensation value while the compensation value is being configured in either the first mode or the second mode, and
the first mode of the first interface element and the second mode of the second interface element are linked together such that a change in the compensation value made through the first mode of the first interface element automatically causes a corresponding change in the second mode of the second interface element.

36. The computer program product of claim 35, the process further comprising:
tracking an event that causes one or more changes in the compensation value or in a result of a comparison between the person and the other compensations of the other persons.

37. The computer program product of claim 35, the process further comprising:
executing a query to populate a data structure concerning the person for the action of calculating the corresponding change.

38. The computer program product of claim 35, the process further comprising:
identifying a list of persons whose compensations are to be compared with the compensation value of the person by using one or more filters.

39. The computer program product of claim 35, in which a change in the compensation value comprises at least one of a numeric value representing the change in the compensation value and a percentage value representing the change in the compensation value.

* * * * *

UNITED STATES PATENT AND TRADEMARK OFFICE
CERTIFICATE OF CORRECTION

PATENT NO. : 9,032,311 B2
APPLICATION NO. : 12/266736
DATED : May 12, 2015
INVENTOR(S) : Mahadevan et al.

It is certified that error appears in the above-identified patent and that said Letters Patent is hereby corrected as shown below:

In drawings,

On sheet 5 of 14, in figure 4, line 3, delete "Comparsion" and insert -- Comparison --, therefor.

On sheet 10 of 14, in figure 9, line 3, delete "Comparsion" and insert -- Comparison --, therefor.

On sheet 10 of 14, in figure 9, under Reference Numeral 914, line 2, delete "Comparatio" and insert -- Comparison --, therefor.

On sheet 10 of 14, in figure 9, line 19, delete "Liick nere" and insert -- Click here --, therefor.

Figure 10:
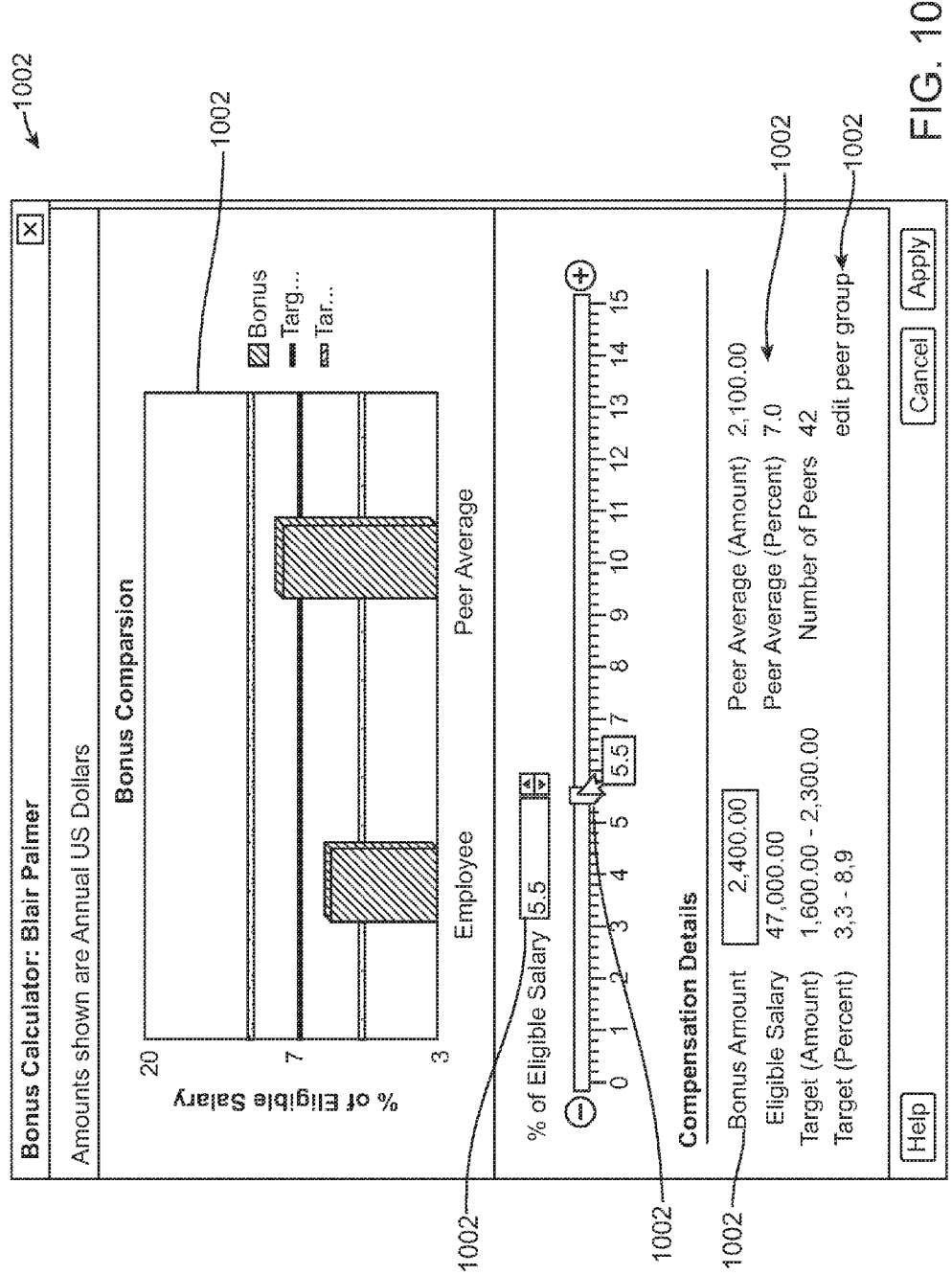
FIG. 10 illustrates an example multi-mode bonus calculator with a control element to edit a peer group according to some embodiments of the invention.

On sheet 11 of 14, in figure 10, line 3, delete "Comparsion" and insert -- Comparison --, therefor.

In specification,

In column 2, line 48, delete "according," and insert -- according --, therefor.

In column 2, line 67, delete "nodes" and insert -- modes --, therefor.

In column 4, line 31, delete "provided," and insert -- provided --, therefor.

In column 4, line 55, delete "manners" and insert -- managers --, therefor.

In column 4, line 67, delete "at" and insert -- an --, therefor.

In column 5, line 35, delete "slider" and insert -- spinbox --, therefor.

In column 7, line 52, delete "as" and insert -- a --, therefor.

Signed and Sealed this
Ninth Day of February, 2016

Michelle K. Lee
*Director of the United States Patent and Trademark Office*

CERTIFICATE OF CORRECTION (continued)
U.S. Pat. No. 9,032,311 B2

In specification,

In column 7, line 54, delete "According," and insert -- According --, therefor.

In column 8, line 47, delete "data," and insert -- data --, therefor.

In column 8, line 67, delete "larger" and insert -- target --, therefor.

In column 9, line 7, delete "workers" and insert -- workers. --, therefor.

In column 9, line 14, after "user" insert -- in --.

In column 9, line 64, delete "1014," and insert -- 1014. --, therefor.

In column 10, line 46, delete "including," and insert -- including --, therefor.